US012650368B2

(12) United States Patent     (10) Patent No.:   US 12,650,368 B2

Kim et al.             (45) Date of Patent:     Jun. 9, 2026

(54) TEST METHOD FOR GLASS STRESS

(71) Applicant: Samsung Display Co., LTD., Yongin-si (KR)

(72) Inventors: Min Ki Kim, Yongin-si (KR); Ji Hyun Ko, Yongin-si (KR); Yong Kyu Kang, Yongin-si (KR); Jinsu Nam, Yongin-si (KR); Hyun Seung Seo, Yongin-si (KR); Jun Ho Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 220 days.

(21) Appl. No.: 18/242,724

(22) Filed: Sep. 6, 2023

(65)        Prior Publication Data

US 2024/0118182 A1     Apr. 11, 2024

(30)      Foreign Application Priority Data

Sep. 29, 2022    (KR) ........................ 10-2022-0124198

(51) Int. Cl.
    *G01N 33/38*       (2006.01)
    *G01N 3/303*      (2006.01)
    *G01N 3/56*        (2006.01)

(52) U.S. Cl.
    CPC .............. *G01N 3/303* (2013.01); *G01N 3/565* (2013.01); *G01N 2203/0033* (2013.01); *G01N 2203/0064* (2013.01); *G01N 2203/0218* (2013.01)

(58) Field of Classification Search
    CPC .................. G01N 3/303; G01N 3/565; G01N 2203/0033; G01N 2203/0064; G01N 2203/0218; G01N 2203/0282; G01N 3/30; G01N 33/386; G01N 3/40; G01N 2203/0066

USPC ............ 73/12.06, 760, 865.9; 65/377, 29.12
    See application file for complete search history.

(56)        References Cited

FOREIGN PATENT DOCUMENTS

| | | | | | |
|---|---|---|---|---|---|
| CN | 116399879 | A | * | 7/2023 | ............. G01N 21/95 |
| FR | 3068136 | A1 | * | 12/2018 | ............. G06F 30/23 |
| JP | 2014221695 | A | * | 11/2014 | |
| JP | 2021099323 | A | | 7/2021 | |
| JP | 7209626 | B2 | * | 1/2023 | ............. C03C 17/30 |
| KR | 1020040006510 | A | | 1/2004 | |
| KR | 1020210016540 | A | | 2/2021 | |

OTHER PUBLICATIONS

George D. Quinn, "On Crack Branching Angles in Glasses and Ceramics", DOI: https://doi.org/10.1016/j.eurceramsoc.2019.11.024, Journal of the European Ceramic Society, 2019, (38 pages).
Norihiko Shinkai, "The Fracture and Fractography of Flat Glass", Plenwn Press, 1994, (45 pages).

* cited by examiner

*Primary Examiner* — Robert R Raevis

(74) *Attorney, Agent, or Firm* — CANTOR COLBURN LLP

(57)          ABSTRACT

A glass stress test method includes breaking a glass, analyzing a shape of a crack of a broken portion of the glass in a plan view, finding a breakage origin of the glass based on the shape of the crack in the plan view, analyzing a cross-section of the breakage origin, and calculating a stress of the glass based on a cross-sectional analysis result of the breakage origin. The stress of the glass is calculated as a value proportional to a floor constant defined by a condition of a floor surface disposed when the glass is broken.

20 Claims, 16 Drawing Sheets

Perform glass drop collision ——S100

Check breakage origin of glass ——S200

Measure length of
mirror region around breakage origin ——S300

Calculate stress of glass ——S400

[1] : 1188.549[μm]

TEST METHOD FOR GLASS STRESS

This application claims priority to Korean Patent Application No. 10-2022-0124198, filed on Sep. 29, 2022, and all the benefits accruing therefrom under 35 U.S.C. § 119, the content of which in its entirety is herein incorporated by reference.

BACKGROUND

1. Field

The disclosure relates to a glass stress test method, and more particularly, to a drop strength test method for a cover glass formed to protect a display unit of a display device.

2. Description of the Related Art

A display device displays an image, and includes a liquid crystal display ("LCD"), an organic light-emitting diode ("OLED") display, a quantum dot light-emitting diode ("QLED"), a micro LED display, etc.

Such a display device is used in various electronic devices such as a smartphone, a mobile phone, a tablet personal computer ("PC"), a monitor, a television, a multimedia player, and a video game console.

This display device includes a cover window that protects the display unit, and the cover window may be formed of a breakable but highly transparent material such as glass.

SUMMARY

One of methods for testing glass stress is to attach the glass to a set or a structure similar to the set and drop the set or the structure to check a height at which the glass breaks. In this case, since an impact applied to the glass varies depending on the design of the set or structure, comparison of the stress of the glass is possible only when the same set or structure is used.

In addition, the comparison of the stress of the glass is possible only in a same drop mode. When a drop test method such as a set drop mode or a ball drop mode is changed, for example, such a glass stress test depending on each mode must be performed again. Accordingly, there is a need for a method for testing the strength of the glass that may be applied even when the set or structure is different and the drop mode is different.

Embodiments have been made in an effort to provide a method for testing a stress of glass that is applicable even when a set or a structure used in a drop test is different. Embodiments have been made in an effort to provide a method for testing a stress of glass that is universally applicable even when a dropping method is different.

An embodiment of the disclosure provides a glass stress test method including breaking a glass by dropping a structure to which the glass is attached such that the glass faces a floor surface, analyzing a shape of a crack of a broken portion of the glass in a plan view, finding a breakage origin of the glass based on the shape of the crack in the plan view, analyzing a cross-section of the breakage origin, and calculating a stress of the glass based on a cross-sectional analysis result of the breakage origin. The stress of the glass is calculated as a value that is proportional to a floor constant defined by a condition of the floor surface.

In an embodiment, the stress of the glass is obtained by $$\sigma_f = \frac{C_{180}}{\sqrt{R_i}} = A \cdot C_{180},$$

where $\sigma_f$ indicates the stress of the glass, $C_{180}$ indicates the floor constant defined according to the condition of the floor surface, Ri indicates a length of a mirror region including a smooth surface that exists in the cross-section of the breakage origin and has a smoothness substantially identical to a smoothness of a mirror, and A indicates a proportional constant.

In an embodiment, the floor constant $C_{180}$ may be more than 3.0 MPa*m$^{0.5}$ and less than 4.5 MPa*m$^{0.5}$.

In an embodiment, the analyzing the cross-section of the breakage origin may include measuring the length of the mirror region that exists in the cross-section.

In an embodiment, the floor surface may include sandpaper.

In an embodiment, the sandpaper may be 180-grit sandpaper.

In an embodiment, the structure to which the glass is attached may be a mobile terminal.

An embodiment of the disclosure provides a glass stress test method including positioning sandpaper on a floor surface and positioning a glass on the sandpaper, breaking the glass by dropping a ball onto the glass, analyzing a shape of a crack of a broken portion of the glass in a plan view, finding a breakage origin of the glass based on the shape of the crack in the plan view, analyzing a cross-section of the breakage origin, and calculating a stress of the glass based on a cross-sectional analysis result of the breakage origin. The stress of the glass is calculated as a value proportional to a floor constant defined by a condition of the floor surface.

In an embodiment, the stress of the glass is obtained by $$\sigma_f = \frac{C_{180}}{\sqrt{R_i}} = A \cdot C_{180},$$

and $\sigma_f$ indicates the stress of the glass, $C_{180}$ indicates the floor constant defined according to the condition of the floor surface, Ri indicates a length of a mirror region including a smooth surface that exists in the cross-section of the breakage origin and has a smoothness substantially identical to a smoothness of a mirror, and A indicates a proportional constant.

In an embodiment, the floor constant $C_{180}$ may be more than 3.0 MPa*m$^{0.5}$ and less than 4.5 MPa*m$^{0.5}$.

In an embodiment, the analyzing the cross-section of the breakage origin may include measuring the length of the mirror region that exists in the cross-section.

In an embodiment, the sandpaper may be 180-grit sandpaper.

In an embodiment, the breaking the glass may include positioning an impact plate on the glass.

An embodiment of the disclosure provides a glass stress test method including breaking a glass, analyzing a shape of a crack of a broken portion of the glass in a plan view, finding a breakage origin of the glass based on the shape of the crack in the plan view, analyzing a cross-section of the breakage origin, and calculating a stress of the glass based on a cross-sectional analysis result of the breakage origin, wherein the cross-section of the breakage origin includes a mirror region including a smooth surface and an opaque mist region disposed around the mirror region, and the stress of the glass is calculated as a value proportional to a floor constant defined by a condition of a floor surface disposed when the glass is broken.

In an embodiment, the calculated stress of the glass is inversely proportional to a square root of a length of the mirror region.

In an embodiment, the stress of the glass is obtained by $$\sigma_f = \frac{C_{180}}{\sqrt{R_i}} = A \cdot C_{180},$$

and $\sigma_f$ indicates the stress of the glass, $C_{180}$ indicates the floor constant defined according to the condition of the floor surface, Ri indicates a length of the mirror region including the smooth surface that exists in the cross-section of the breakage origin of the glass, and A indicates a proportional constant.

In an embodiment, the floor constant $C_{180}$ is more than 3.0 MPa*m$^{0.5}$ and less than 4.5 MPa*m$^{0.5}$.

In an embodiment, the cross-section of the breakage origin may further include a feather-shaped hackle region disposed around the opaque mist region.

In an embodiment, the analyzing the shape of the crack may include classifying the shape of the crack, and determining a progression direction of the crack depending on the shape of the crack.

In an embodiment, the finding the breakage origin of the glass may include finding the breakage origin of the glass by reversely tracing a progression direction of the crack.

By embodiments, the stress of a universal glass may be tested regardless of conditions such as a size, weight, structure, and material of a set or structure used in a drop test.

In addition, since the stress of the glass may be compared and tested regardless of a type of set used in the drop test, same test data may be applied to products of other models.

In addition, during the drop test, an error depending on a drop mode is reduced to enable an accurate test, and since the test spread is reduced, the stress of the glass may be tested with a substantially small number of parameters.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
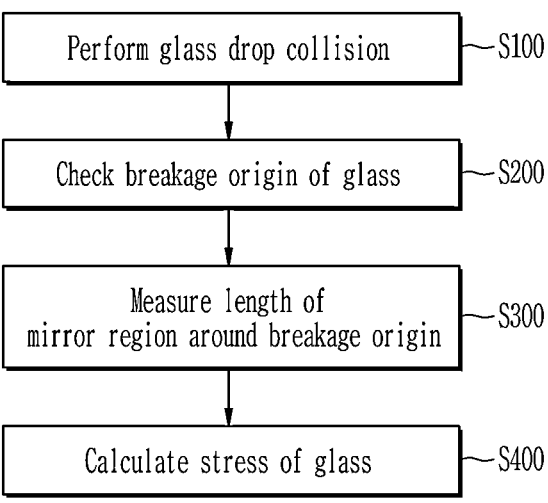
FIG. 1 illustrates a flowchart showing an embodiment of a glass stress test method.

The disclosure will be described more fully hereinafter with reference to the accompanying drawings, in which embodiments of the disclosure are shown. As those skilled in the art would realize, the described embodiments may be modified in various different ways, all without departing from the spirit or scope of the disclosure.

To clearly describe the disclosure, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the disclosure is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that, when an element such as a layer, film, region, plate, etc., is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means when an object portion is viewed from above, and the phrase "in a cross-sectional view" means when a cross-section taken by vertically cutting an object portion is viewed from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 illustrates a flowchart showing an embodiment of a glass drop stress test method.

The glass drop stress test method may be a method of testing impact strength of a cover window formed on a front surface of a portable electronic device such as a mobile phone to protect a display unit.

First, a glass drop collision test is performed (S100). The glass drop collision test may be performed by a set drop collision method and a ball drop collision method.

The set drop collision method is a method of attaching a glass to a real set such as a portable terminal or a similar structure and dropping the glass from a predetermined height to a floor to determine whether the glass is broken. The glass may be a cover window of the portable electronic device.

In an embodiment, after attaching the glass to the structure and dropping the structure such that the glass faces the floor, it is possible to check whether or not the glass is broken, for example. When the glass is not broken, it is a method of measuring a height of a point where the glass is broken by repeating a drop test while increasing a drop position until the glass is broken. A detailed set drop collision method will be described later with reference to FIG. 2.

The ball drop collision method is a method of determining whether or not the glass is broken by positioning a glass on a predetermined bottom surface and dropping a ball toward an upper surface of the glass. The bottom surface may include sandpaper, and an impact plate may be further disposed on the upper surface of the glass. The ball drop collision method is a method of performing a repeated test by increasing a drop height of a ball until the glass is broken, and measuring a height of the ball at a point where the glass is broken. A detailed ball drop collision method will be described later with reference to FIG. 3.

After performing drop collision of the glass, a planar shape of a broken part of the glass is analyzed, and a breakage origin of the glass is found (S200). First, a crack shape of the broken portion of the glass in a plan view may be distinguished, and a direction of crack progression may be inferred depending on each type of crack, and then an origin of the crack may be found by following the direction of crack progression in reverse. A method of distinguishing a type of crack and a process of inferring a progression direction of the crack will be described later with reference to FIG. 4A to FIG. 5B.

After finding a breakage origin of a glass, a cross-section of the breakage origin is analyzed through an optical microscope. In an embodiment, a cross-section around the breakage origin of the glass may include a mirror region including a mirror-like smooth and clear surface, a mist region including a haze-like or opaque surface, and a hackle region including a feather-like surface, for example. A detailed image of each region may be checked in FIG. 6 below. In the cross-section of the breakage origin, a length Ri (refer to Equation 1 below) of the mirror region existing around the breakage origin is measured (S300). A distance between the length Ri of the mirror region and a boundary between mirror region and the mist region seen through an optical microscope may be measured.

Then, the stress of the glass is calculated based on the measured length Ri of the mirror region (S400). In an embodiment, the stress of the glass may be calculated by Equation 1 below.

$$\sigma_f = \frac{C_{180}}{\sqrt{R_i}} = A \cdot C_{180} \qquad \text{Equation 1}$$

Here, $\sigma_f$ indicates the strength of the glass, and Ri indicates the length of the mirror region. A unit of the stress of the glass may be expressed as stress intensity in MPa. A stress $\sigma_f$ of the glass and a square root of the length Ri of the mirror region have an inversely proportional relationship. When the length of the mirror region is short, it may indicate that the stress of the glass is substantially high and destruction is progressed by a greater force. When the length of the mirror region is long, it may indicate that the stress of the glass is substantially low and destruction is progressed by a relatively small force.

$C_{180}$ indicates a floor constant defined by a condition of a floor surface. In an embodiment, when the floor surface on which glass falls and collides includes 180-grit sandpaper, the floor constant $C_{180}$ may have a value ranging from 3.0 MPa*m$^{0.5}$ to 4.5 MPa*m$^{0.5}$, for example.

In an embodiment, the floor constant $C_{180}$ may be a value derived from a bending strength calculated by a bending strength measurement method and the length Ri of the mirror region. The bending strength of a glass to be tested may be derived according to a known four point bending strength measurement method. In an embodiment, it is a method of deriving the value of the floor constant $C_{180}$ by scratching the glass to be tested with 180-grit sandpaper, and then fixing it with a support at two points at a lower portion of the glass, applying pressure from two points at an upper portion of the glass, and applying an average length of the mirror region and the bending strength derived by measuring a maximum load value to Equation 1, for example.

In an embodiment, when the floor surface includes the 180-grit sandpaper, the floor constant $C_{180}$ may be derived from 3.33377 MPa*m$^{0.5}$ to 4.43509 MPa*m$^{0.5}$. Accordingly, the floor constant $C_{180}$ may range from approximately 3.0 MPa*m$^{0.5}$ to 4.5 MPa*m$^{0.5}$.

The stress $\sigma_f$ of the glass at a point at which it begins to break may be obtained by the floor constant $C_{180}$ by a square root of the length Ri of the mirror region. In addition, the stress Gf of the glass may be calculated as a value proportional to the floor constant $C_{180}$.

Accordingly, when the conditions of the floor surface are the same, stress data of the glass may be equally calculated regardless of drop conditions of the glass, e.g., a size, a weight, a structure, a material, or the like of the set structure. In an embodiment, the strength of each type of glass may be evaluated, and the stress of the glass may be calculated by Equation 1 described above. Data of a predetermined stress test will be described below along with FIG. 7A to FIG. 10B.

Figure 2:
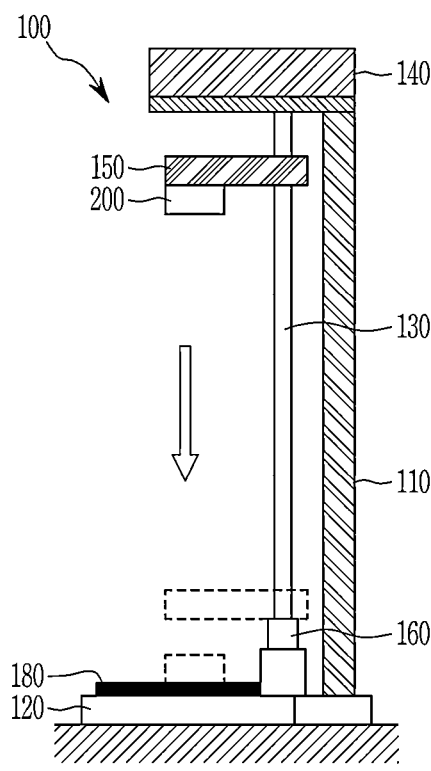
FIG. 2 illustrates an embodiment of a set drop collision method.

FIG. 2 illustrates an embodiment of a set drop collision method.

A set drop collision apparatus 100 of FIG. 2 may include a fixed frame 110, a floor surface 120 extending from a floor of the fixed frame 110, a driver 140 coupled to an upper end of the fixed frame 110, a guide 130 spaced apart from the fixed frame 110 by a predetermined distance to connect the driver 140 and the floor surface 120, a holder 150 coupled to move vertically along the guide 130 and for fixing the set structure 200, and a buffer 160 for stopping descent of the holder 150 below a predetermined height and alleviating an impact of the holder 150 when the holder 150 falls.

In an embodiment, the floor surface 120 may include sandpaper 180 having a rough surface. The sandpaper 180 is formed by fixing grains such as sand grains and glass powder on paper or cloth, and characteristics of the sandpaper 180 are changed depending on a size of the grains. It may be appropriate to use sandpaper 180 having a grain size that is greater than or equal to a predetermined level in order to provide a floor surface similar to an actual external environment. Roughness of sandpaper may be expressed as grit, which indicates a number of particles per unit area. That is, when the grit is low, there are a substantially small number of particles per unit area, which indicates that the unit area should be filled with a substantially small number of particles, and accordingly, as the grit is lower, granularity of the particles increases and a surface thereof becomes rougher. Types of the sandpaper depending on the roughness thereof may range from about 60 grit to about 2000 grit, and for example, 180-grit sandpaper may be used under a condition that is most similar to the actual external environment.

In the set drop collision apparatus (also referred to as "glass set drop collision apparatus") 100, the driver 140 raises the holder 150 to which the set structure 200 is fixed to a predetermined height, and allows the holder 150 to be freely dropped toward the floor surface 120 disposed on a floor. The holder 150 freely falls along the guide 130. The set structure 200 is fixed to the holder 150 and falls freely, and then is separated therefrom at a predetermined height where the buffer 160 is disposed and collides with the floor surface 120 including the sandpaper 180. Glass attached to the set structure 200 may be broken by a collision. When the glass is not broken, a test may be repeatedly performed while increasing a drop position of the set structure 200 until the glass is broken. In an embodiment, the set structure 200 is dropped from a position with a substantially low height of about 20 centimeter (cm), for example. Thereafter, while raising the height sequentially, it is checked for damage after falling. The test may be performed while raising the height at equal intervals, e.g., at intervals of about 1 cm to about 10 cm, until the glass is broken.

Herein, the height (in terms of cm) at which the glass is broken may be defined as the stress of the glass. In an alternative embodiment, the glass may be repeatedly dropped at a same height until the glass is broken, and a number of drops at which the glass is broken may be defined as stress. The breakage height, the number of drops, etc., used as the strength of glass may be determined as an average value obtained by testing at least dozens of samples.

In an embodiment, when the glass breaks after the drop test, a breakage origin of the glass may be traced, a cross-section of the breakage origin may be analyzed, and the stress of the glass may be calculated through Equation 1 above. In this case, the stress of the glass is inversely proportional to a square root of a length of the mirror region on the cross-section of the breakage origin and is calculated as a proportional value to the floor constant defined depending on a condition of the floor surface, and thus when the conditions of the floor surface are the same, a calculation error is reduced, and accordingly, it may be possible to accurately evaluate the stress of glass even with a substantially small number of parameters.

The buffer 160 may prevent the holder 150 from descending below a predetermined height before reaching the floor surface 120, and may reduce an impact force and noise generated in the event of a collision.

Figure 3:
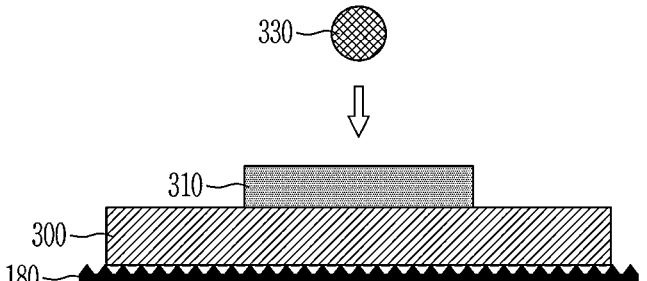
FIG. 3 illustrates an embodiment of a ball drop collision method.

FIG. 3 illustrates an embodiment of a ball drop collision method.

The ball drop collision method in an embodiment is a method of positioning the sandpaper 180 on a floor, contacting a lower surface of a glass 300 on the sandpaper 180, and then dropping a ball 330 on an upper surface of the glass 300 to apply an impact. A material or weight of the ball 330 for applying the impact to the glass 300 may be changed depending on a purpose, and for example, the ball 330 may be a metal ball such as stainless steel. The ball 330 may directly collide with the glass 300 disposed on the floor to damage the glass 300. In an embodiment, an impact plate 310 may be further disposed on the upper surface of the glass 300. The impact plate 310 may include a metal such as stainless steel. The ball 330 may fall toward the impact plate 310 disposed above the glass 300 to indirectly apply an impact to the glass 300 to damage it. When the glass is not broken, the test may be repeatedly performed by increasing the drop position of the ball 330 until the glass 300 is broken.

Herein, a drop height of the ball 330 that breaks the glass 300 may be defined as the stress of the glass. The drop height of a ball used as the strength of glass may be determined as an average value tested for at least dozens of samples.

Figure 4A:
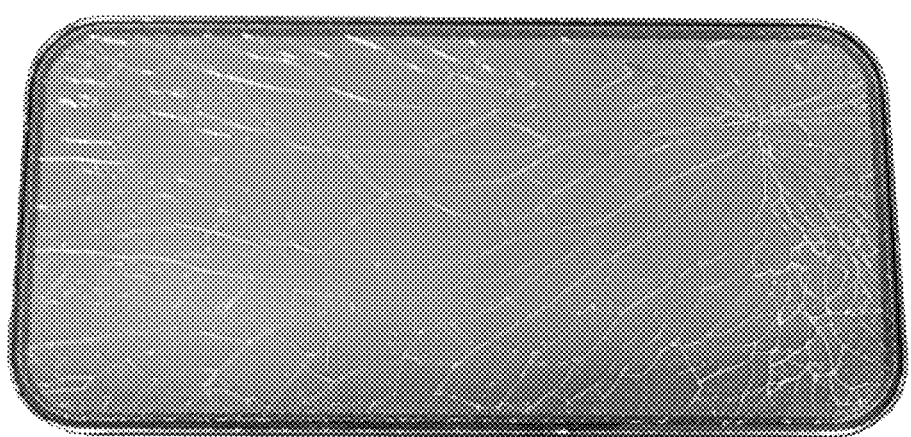
FIGS. 4A and 4B and FIGS. 5A and 5B each illustrate an embodiment of a planar photograph of a broken portion of a glass.
Figure 4B:
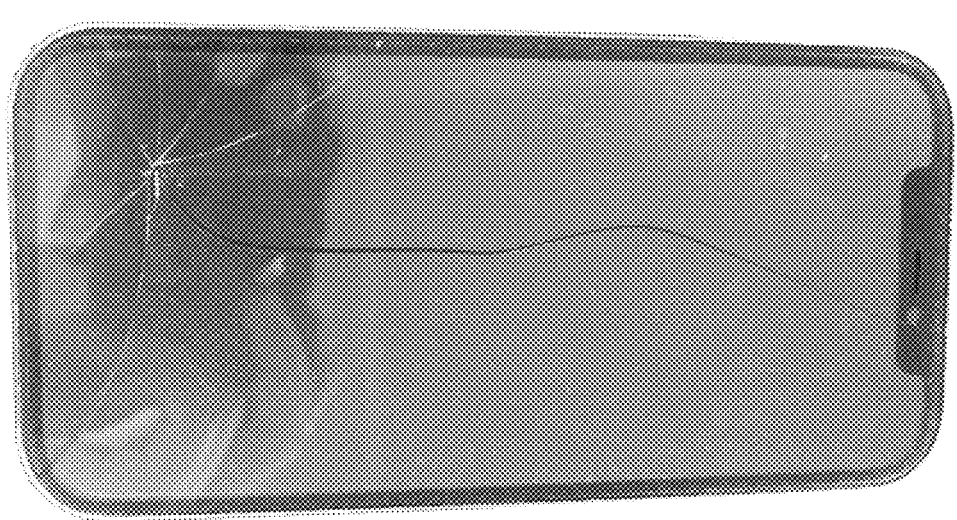

FIG. 4A and FIG. 4B each illustrate a planar photograph of an embodiment of a broken glass after a set drop collision of the glass. Drop collision was performed by attaching the glass to an actual mobile phone set. After the collision test is performed, a type of crack may be classified based on a flat crack shape of the broken glass. As shown in the photograph of FIG. 4A, cracks may be distributed fairly densely in a damaged area, and the cracks may be classified as branching cracks when the cracks are generated by splitting like tree branches extending out. In addition, as illustrated in FIG. 4B, when a number of crack branches is substantially small and they are not branched, it may be regarded as a case where cracks meet while growing. In each case, a direction of crack progression may be inferred by analyzing a shape of the cracks.

Figure 5A:
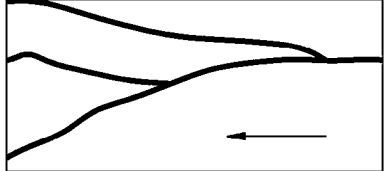
Figure 5B:
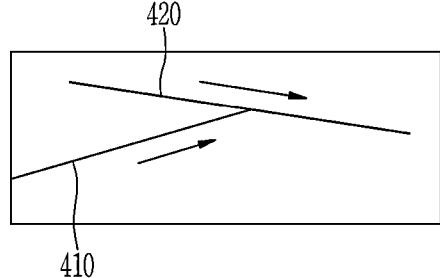

FIG. 5A and FIG. 5B each illustrate a schematic plan view of a crack generated portion of glass. FIG. 5A illustrates a case in which cracks are formed to have a branching shape. In the case where cracks are generated by splitting like tree branches extending out, i.e., plural cracks extend from one crack, it may be inferred that the cracks have grown in the direction from before the cracks split to after the cracks split. As illustrated in FIG. 5A, it may be determined that cracks split one by one from right to left to form a tree branch shape, and accordingly, cracks have grown from right to left (in a direction of an arrow).

FIG. 5B illustrates a case where two cracks grow and meet. It may be inferred that, when two non-branched cracks grow and meet each other, the broken crack was created later. In FIG. 5B, it may be analyzed as a case where the first crack 410 at a lower portion meets the second crack 420 at an upper portion, the first crack 410 does not progress any further and is cut off, and the second crack 420 continues to progress. In this case, it may be determined that as for a direction of crack progression, a first crack 410 progressed toward the point where the first crack 410 met the second crack 420 and was disconnected, and it may be inferred that the second crack 420 also progressed in the same direction. That is, in this case, it may be seen that the crack progressed from left to right (in the direction of the arrow).

As such, the direction of crack progression may be inferred based on the planar shape of the crack at a broken portion of the glass caused by the collision, and a breakage origin may be found by following the direction of the crack progression in reverse.

Figure 6:
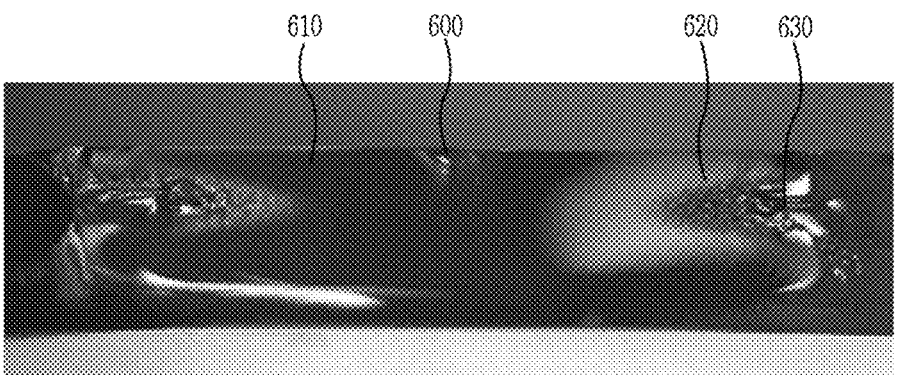
FIG. 6 illustrates a cross-sectional photograph of an embodiment of a broken portion of a glass.

FIG. 6 illustrates a cross-sectional photograph showing an embodiment of surroundings of a breakage origin.

Referring to FIG. 6, a cross-section of the breakage origin of the glass may include a mirror region 610 including a smooth surface like a mirror around a breakage origin 600 and a mist region 620 including a mist surface around the mirror region. A hackle region 630 including a feather-like shape may exist around the mist region 620. The length Ri of the mirror region 610 may be used to calculate the stress of the glass.

FIGS. 7A to 7D illustrate a cross-sectional photograph of an embodiment of a broken portion of a glass after drop evaluation. FIG. 7A, FIG. 7B, FIG. 7C, and FIG. 7D illustrate cross-sectional photographs of breakage origins after a same method of drop evaluation by different types of the glass. In an embodiment, the drop evaluation may be performed by a set drop collision method, and a floor surface may be performed by 180 grit sandpaper, for example.

Figure 7A:
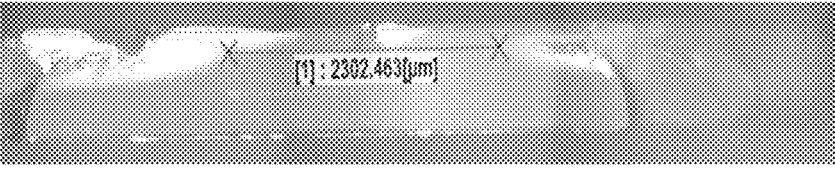
FIGS. 7A to 7D illustrate a cross-sectional photograph of an embodiment of a broken portion of a glass.
Figure 7B:
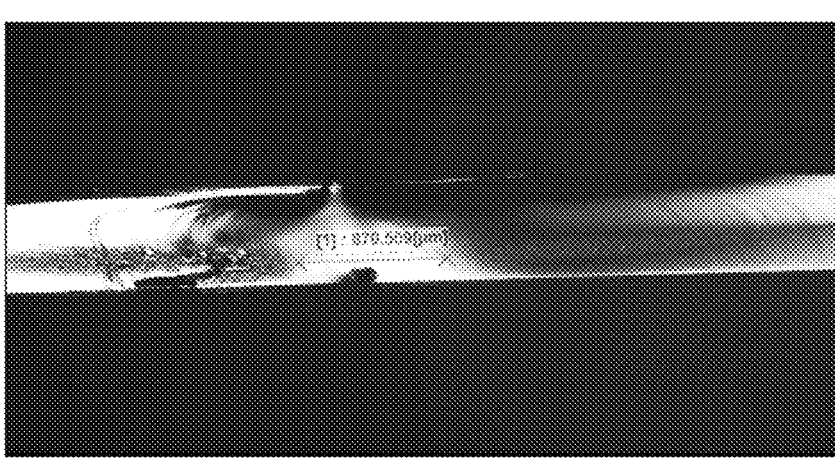
Figure 7C:
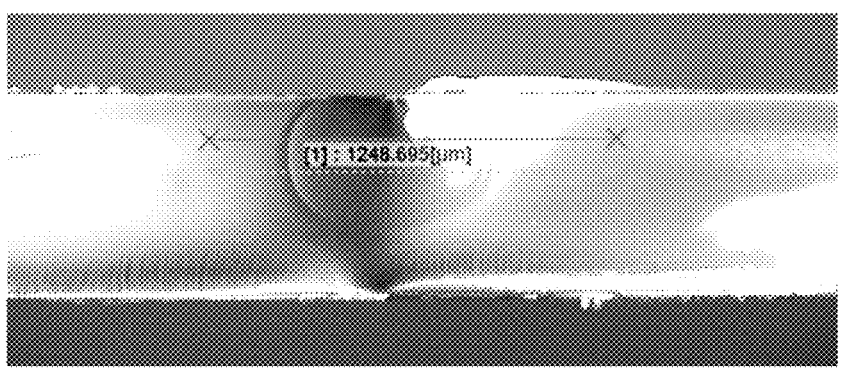
Figure 7D:
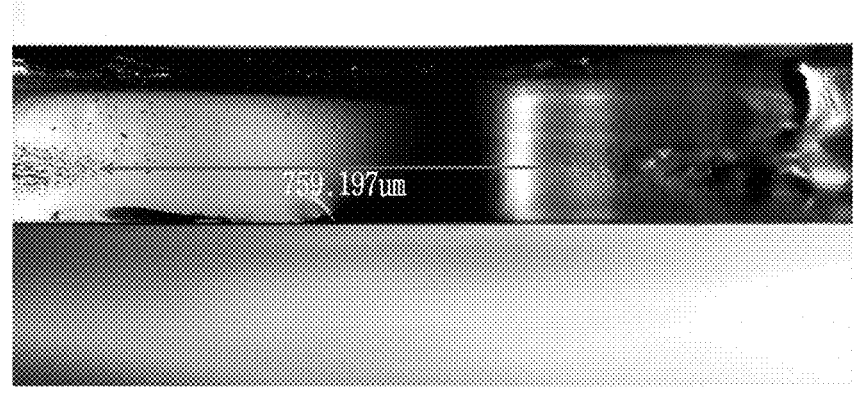

Specifically, FIG. 7A illustrates a cross-sectional photograph of a first glass after a drop collision, FIG. 7B and FIG. 7C illustrate cross-sectional photographs of a second glass after a drop collision, and FIG. 7D illustrates a cross-sectional photograph of a third glass after a drop collision.

As described above, it is possible to find a breakage origin of a glass and analyze a cross-section at the breakage origin, based on a planar shape of a clack of the broken glass. The stress of the glass may be calculated by measuring the length Ri of the mirror region that exists in the cross-section of the breakage origin. A distance between the length Ri of the mirror region and a boundary between the mirror region and the mist region seen may be measured. In an embodiment, the length Ri of the mirror region of a broken cross-section of the glass may be obtained by measuring between boundaries of mist regions disposed at opposite sides of the mirror region, for example.

FIG. 7A illustrates a cross-section of the first glass broken by set-dropping it, and the length Ri of the mirror region of the first glass was measured to be about 2302.463 micrometers (μm).

FIG. 7B and FIG. 7C each illustrate a cross-section of the second glass broken by set-dropping it. The length Ri of the mirror region of the broken section of the second glass in FIG. 7B is measured as about 870.509 μm, and the length Ri of the mirror region of the broken portion of the second glass in FIG. 7C was measured as about 1248.695 μm. The length Ri of the mirror region of the second glass may be calculated as an average value of about 1059.602 μm.

FIG. 7D illustrates a cross-section of the third glass broken by set-dropping it, and the length Ri of the mirror region of the broken section of the third glass was measured as about 762.404 μm.

When the length Ri of the mirror region at a breakage origin of each glass is derived as described above, stresses of the first glass, the second glass, and the third glass may be calculated by applying it to Equation 1.

$$\sigma_f = \frac{C_{180}}{\sqrt{R_i}} = A \cdot C_{180} \qquad \text{Equation 1}$$

Here, the floor constant $C_{180}$ is a constant defined when 180-grit sandpaper is used for an impact floor surface, and for example, the floor constant $C_{180}$ may be between 3.0 MPa*m^0.5 to 4.5 MPa*m^0.5.

The stress of the glass may be calculated by substituting the measured length Ri of the mirror region of each glass into Equation 1, which is a formula for calculating glass stress. The stress of the glass may be calculated as a unit of stress, and may be derived as a proportional value of the floor constant $C_{180}$. The calculated stress of the first glass is 20.84*$C_{180}$, that of the second glass is 30.72*$C_{180}$, and that of the third glass is 36.29*$C_{180}$.

Figure 8:
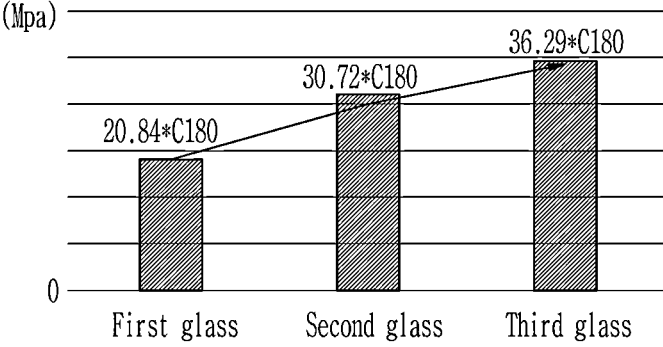
FIG. 8 illustrates a result graph of an embodiment of a glass stress test.
Figure 9:
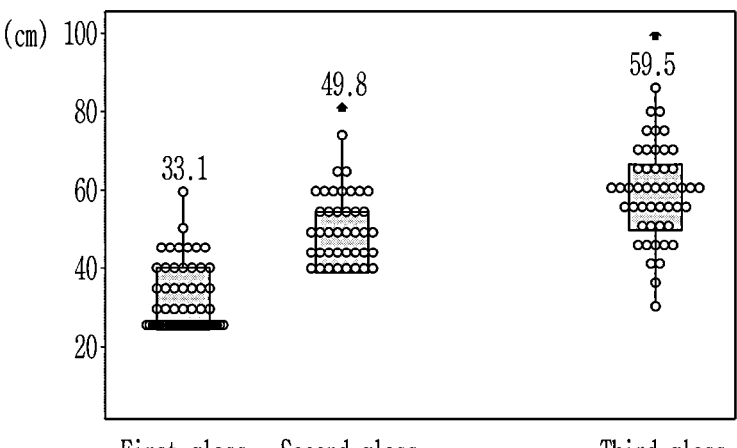
FIG. 9 illustrates a result graph of a comparative embodiment of a glass stress test.

FIG. 8 illustrates a graph showing results of stress test of the first glass, the second glass, and the third glass in the embodiment of FIG. 7. FIG. 9 illustrates a result graph of a glass stress test according to a comparative embodiment. FIG. 9 illustrates a graph showing results of a glass stress test performed by a same type of glass as that in FIG. 7 and a same set drop test method. The glass stress test method according to the comparative embodiment of FIG. 9 was performed approximately 50 times for each type of glass. In an embodiment, for each glass, the drop test was conducted until the glass was broken while increasing the drop height in the set drop method, and the drop test was repeatedly performed until about 50 pieces of glass were broken, for example. The drop height at which the glass breaks may be recorded, and the average drop height may be calculated. Referring to the graph of FIG. 9, an average breakage height of the first glass is 33.1 cm, an average breakage height of the second glass is 49.8 cm, and an average breakage height of the third glass is 59.5 cm.

The results of the embodiment of FIG. 8 and the comparative embodiment of FIG. 9 are shown in Table 1 below.

TABLE 1

| Division | | First glass | Second glass | Third glass |
|---|---|---|---|---|
| Example | Stress (MPa) | 20.84*$C_{180}$ | 30.72*$C_{180}$ | 36.29*$C_{180}$ |
| | Ratio with glass | 100% | 147% | 174% |
| Comparative Example | Breakage height (cm) | 33.1 | 49.8 | 59.5 |
| | Ratio with glass | 100% | 150% | 180% |

Result values of each glass were expressed as proportional ratios based on the first glass in order to compare the stress of each glass in the embodiment of FIG. 8 with a resultant value obtained from the comparative embodiment. According to Table 1, it may be seen that a ratio of the stress calculated for each glass in the embodiment of FIG. 8 and the comparative embodiment of FIG. 9 is almost the same. In the case of the comparative embodiment, a height result may differently appear depending on a type of set to which the glass is attached, and thus the test depending on set change should be performed again, and dispersion may occur depending on a drop mode.

In accordance with a glass stress test method in an embodiment, when the glass is broken regardless of the type of set and the drop mode, the stress of the glass may be calculated by analyzing a cross-section at a breakage origin. Accordingly, in accordance with the glass stress test method in the embodiment, in the case of a same glass, there may be no need for re-test due to set change, and a same result may be obtained regardless of a drop mode. Therefore, since an accurate test may be possible with relatively few parameters, more accurate and efficient test of the stress of the glass may be possible.

Figure 10A:
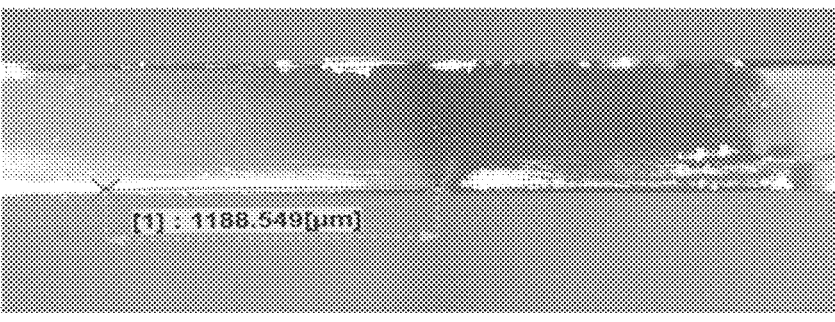
FIGS. 10A and 10B illustrate a cross-sectional photograph of an embodiment of a broken portion of a glass.
Figure 10B:
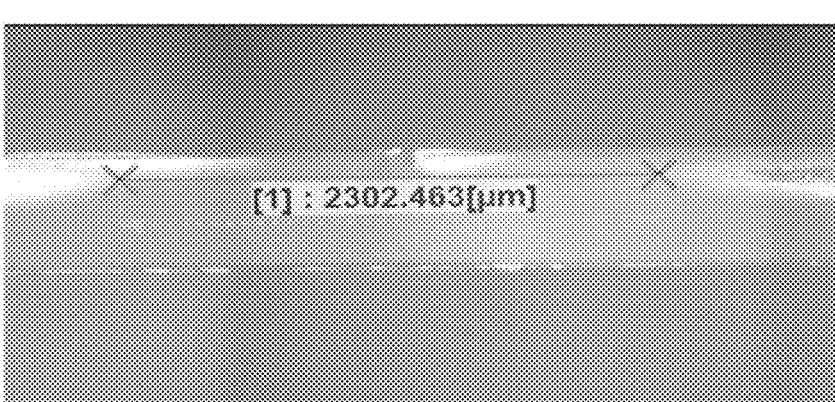

FIGS. 10A and 10B illustrate a cross-sectional photograph of an embodiment of a broken portion of a glass.

FIG. 10A and a FIG. 10B each illustrate a cross-sectional view of a same glass broken according to another dropping method. FIG. 10A illustrates a cross-section of a breakage origin after a ball drop collision, and FIG. 10B illustrates a cross-section of the breakage origin after a set drop collision. Roughness of a floor provided a same environment by 180-grit sandpaper. As described above, it is possible to find a breakage origin of a glass and analyze a cross-section photograph at the breakage origin, based on a clack shape of a breakage cross-sectional view of the glass. It is possible to measure the length Ri of the mirror region of a mirror-smooth surface disposed in the cross-section of the breakage origin.

In an embodiment, in the case of FIG. 10A, the length Ri of the mirror region may be calculated as about 2377 μm, which is twice the distance between the breakage origin and the mist region, i.e., 1188.549 µm, and in the case of FIG. 10B, the length Ri of the mirror region may be measured as about 2302.463 µm, which is a distance between boundaries of the mirror region and the mist region with the breakage origin provided therebetween, for example. When a length of each mirror region at the breakage origin of the glass is derived, the stress of the glass depending on each drop method may be calculated by applying it to Equation 1, which is the above-described glass stress calculation formula.

$$\sigma_f = \frac{C_{180}}{\sqrt{R_i}} = A \cdot C_{180} \qquad \text{Equation 1}$$

The stress of the glass may be expressed as a constant multiple (also referred to as a proportional constant) A of the floor constant $C_{180}$ defined by a condition of the floor surface. The stress of the glass may be calculated as a product of a reciprocal of a square root of the length Ri of the mirror region and the floor constant $C_{180}$.

According to the ball drop collision method of FIG. 10A, the length of the mirror region of the glass may be about 2377 µm, and the stress of the glass obtained in FIG. 10A may be expressed as 48.75*$C_{180}$.

According to the set drop collision method of FIG. 10B, the length of the mirror region of the glass may be about 2302 µm, and the stress of the glass obtained in FIG. 10B may be expressed as 47.98*$C_{180}$.

As such, the stress of glass may be calculated as a proportional value of the floor constant. Accordingly, when the conditions of the floor surface are the same, stress data of the glass may be equally calculated regardless of drop conditions, e.g., a size, a weight, a structure, a material, or the like of the set structure.

As such, according to the glass stress test method in an embodiment, it may be seen that glass stress results are almost the same even by different drop collision methods. Accordingly, it is possible to perform a more accurate and efficient test of the stress of glass, and it is possible to obtain universal test results applicable to different sets or structures including the glass.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A glass stress test method comprising:
breaking a glass by dropping a structure to which the glass is attached, the glass facing a floor surface;
analyzing a shape of a crack of a broken portion of the glass in a plan view;
finding a breakage origin of the glass based on the shape of the crack in the plan view;
analyzing a cross-section of the breakage origin; and
calculating a stress of the glass based on a cross-sectional analysis result of the breakage origin,
wherein the stress of the glass is calculated as a value proportional to a floor constant defined by a condition of the floor surface.

2. The glass stress test method of claim 1, wherein the stress of the glass is obtained by

12

$$\sigma_f = \frac{C_{180}}{\sqrt{R_i}} = A \cdot C_{180},$$

where $\sigma_f$ indicates the stress of the glass, $C_{180}$ indicates the floor constant defined according to the condition of the floor surface in a case in which the floor surface on which the glass falls and collides includes 180-grit sandpaper, $R_i$ indicates a length of a mirror region including a smooth surface which exists in the cross-section of the breakage origin and has a smoothness substantially identical to a smoothness of a mirror, and A indicates a proportional constant represented by a reciprocal of a square root of the length Ri.

3. The glass stress test method of claim 2, wherein the floor constant is more than 3.0 MPa*m$^{0.5}$ and less than 4.5 MPa*m$^{0.5}$.

4. The glass stress test method of claim 2, wherein the analyzing the cross-section of the breakage origin includes
measuring the length of the mirror region which exists in the cross-section.

5. The glass stress test method of claim 1, wherein the floor surface includes sandpaper.

6. The glass stress test method of claim 5, wherein the sandpaper is 180-grit sandpaper.

7. The glass stress test method of claim 1, wherein the structure to which the glass is attached is a portable electronic device.

8. A glass stress test method comprising:
positioning sandpaper on a floor surface and positioning a glass on the sandpaper;
breaking the glass by dropping a ball onto the glass;
analyzing a shape of a crack of a broken portion of the glass in a plan view;
finding a breakage origin of the glass based on the shape of the crack in the plan view;
analyzing a cross-section of the breakage origin; and
calculating a stress of the glass based on a cross-sectional analysis result of the breakage origin,
wherein the stress of the glass is calculated as a value proportional to a floor constant defined by a condition of the floor surface.

9. The glass stress test method of claim 8, wherein the stress of the glass is obtained by $$\sigma_f = \frac{C_{180}}{\sqrt{R_i}} = A \cdot C_{180},$$

where $\sigma_f$ indicates the stress of the glass, $C_{180}$ indicates the floor constant defined according to the condition of the floor surface in a case in which the floor surface on which glass falls and collides includes 180-grit sandpaper, $R_i$ indicates a length of a mirror region including a smooth surface which exists in the cross-section of the breakage origin and has a smoothness substantially identical to a smoothness of a mirror, and A indicates a proportional constant represented by a reciprocal of a square root of the length Ri.

10. The glass stress test method of claim 9, wherein the analyzing the cross-section of the breakage origin includes
measuring the length of the mirror region which exists in the cross-section.

11. The glass stress test method of claim 9, wherein the floor constant is more than 3.0 MPa*m$^{0.5}$ and less than 4.5 MPa*m$^{0.5}$ .

12. The glass stress test method of claim 8, wherein the sandpaper is 180-grit sandpaper.

13. The glass stress test method of claim 8, wherein breaking the glass includes positioning an impact plate on the glass.

14. A glass stress test method comprising:

breaking a glass;

analyzing a shape of a crack of a broken portion of the glass in a plan view;

finding a breakage origin of the glass based on the shape of the crack in the plan view;

analyzing a cross-section of the breakage origin; and calculating a stress of the glass based on a cross-sectional analysis result of the breakage origin, wherein the cross-section of the breakage origin includes a mirror region including a smooth surface which has a smoothness substantially identical to a smoothness of a mirror and an opaque mist region disposed around the mirror region, and the stress of the glass is calculated as a value proportional to a floor constant defined by a condition of a floor surface provided when the glass is broken.

15. The glass stress test method of claim 14, wherein the calculated stress of the glass is inversely proportional to a square root of a length of the mirror region.

16. The glass stress test method of claim 14, wherein the stress of the glass is obtained by $$\sigma_f = \frac{C_{180}}{\sqrt{R_i}} = A \cdot C_{180},$$

where $\sigma_f$ indicates the stress of the glass, $C_{180}$ indicates the floor constant defined according to the condition of the floor surface in a case in which the floor surface on which glass falls and collides includes 180-grit sandpaper, $R_i$ indicates a length of the mirror region including the smooth surface which exists in the cross-section of the breakage origin, and A indicates a proportional constant represented by a reciprocal of a square root of the length Ri.

17. The glass stress test method of claim 14, wherein the floor constant is more than 3.0 MPa*m$^{0.5}$ and less than 4.5 MPa*m$^{0.5}$.

18. The glass stress test method of claim 14, wherein the cross-section of the breakage origin further includes a feather-shaped hackle region disposed around the opaque mist region.

19. The glass stress test method of claim 14, wherein the analyzing the shape of the crack includes:

classifying the shape of the crack; and determining a progression direction of the crack depending on the shape of the crack.

20. The glass stress test method of claim 14, wherein the finding the breakage origin of the glass includes finding the breakage origin of the glass by reversely tracing a progression direction of the crack.

* * * * *